(No Model.)
A. I. SANBORN.
CUTTER FOR WOOD WORKING MACHINES.
No. 282,671. Patented Aug. 7, 1883.
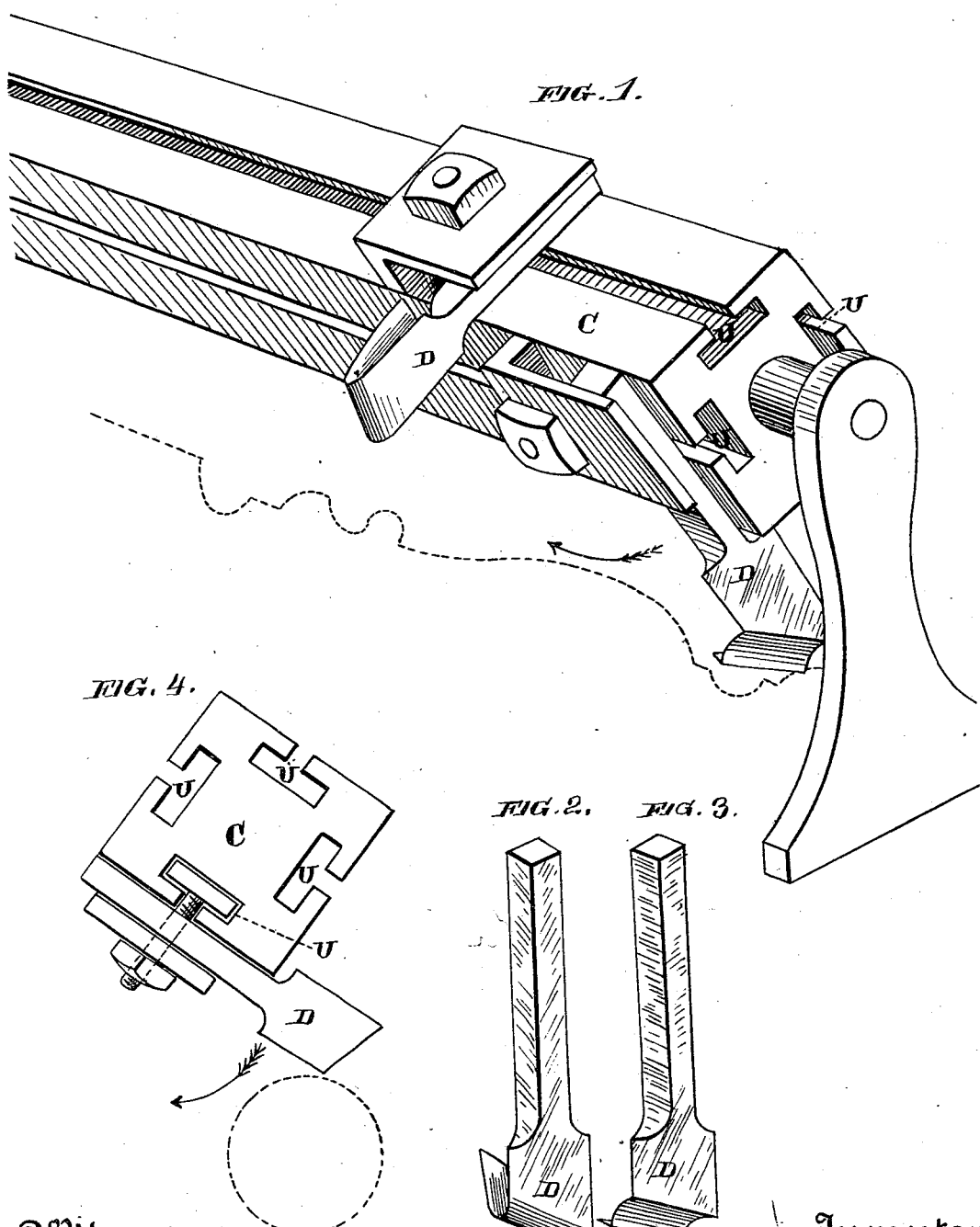

UNITED STATES PATENT OFFICE.

ALBION I. SANBORN, OF SAN FRANCISCO, CALIFORNIA.

CUTTER FOR WOOD-WORKING MACHINES.

SPECIFICATION forming part of Letters Patent No. 282,671, dated August 7, 1883.

Application filed February 27, 1883. (No model.)

*To all whom it may concern:*

Be it known that I, ALBION I. SANBORN, of the city and county of San Francisco, State of California, have invented an Improvement in Cutters for Wood-Working Machines, of which the following is a specification.

My invention relates to certain improvements in cutters which are to be attached to revolving cutter-heads, for the purpose of turning or working wood in various ornamental forms, either round, square, or octagonal.

It consists of a steel plate or series of plates bent to the shape of the molding or the part of it to be cut, these plates being bolted or secured to the cutter-heads, so as to project backward from the revolving head, as will be more fully explained by reference to the accompanying drawings, in which—

Figure 1 is a view of the cutter-head. Figs. 2 and 3 show forms of cutters. Fig. 4 shows manner of cutting.

In the ordinary construction of the cutters to be attached to the revolving cutter-heads of wood-working machines, they are so formed as to be bolted upon the back side of the cutter-head relative to its direction of revolution, and the cutting-edge projects to the front, so as to make what may be termed a "lifting cut." In one case the cutter has been so formed that the cutting-edge stands in a lateral oblique relation with the shank, so as to make the part which cuts deepest the last to cut; but it is fixed to the head in the manner above described.

In my invention the cutters D D are made of a piece of square steel drawn down to a thin plate, which is bent up at the end into the shape of the desired form or molding. The front or inside edge is sharpened, and is easily kept sharp by whetting or filing on the inside of the edge, so that the cutters will always retain their shape.

Instead of being bolted upon the back side of the cutter-head, (relative to its direction of rotation,) so that the cutter projects forward in the usual manner, the cutters are bolted to the front side, and the cutting portion projects backward, so that a drawing cut is secured, and the work will be smoother and more perfect.

The cutters are made in sections, and are bolted or clamped to the cutter-head by means of bolts, the heads of which are held in slots U, which extend the whole length of the head. The cutters are preferably clamped to the cutter-head in pairs at opposite sides, so as to balance them and make the cuts successive, instead of simultaneous, and this relieves the strain when the work reaches the cutter. Every pattern to be turned in a round piece or formed in an octagonal or other polygonal piece or post is made complete from end to end by these short sections of cutters, secured as before described, so as to make a continuous cut from end to end.

Each cutter is so formed that its cut will commence at the highest part of its section, and from the peculiar shape and manner of securing them to the cutter-head they make a drawing cut, like that made by a knife, in contradistinction to that made by a chisel or a tool which is fixed to the back of the cutter-head, and which may be termed a "lifting cut." This drawing cut is especially perfect in turning or working wood across the grain, as it has no tendency to roughen up the fibers, but leaves the work perfectly smooth and polished. This construction also enables me to turn or finish the whole length of any post or piece of irregular work at one operation.

Having thus described my invention, what I claim as new, and desire to secure by Letters Patent, is—

A tool or cutter for wood-working machines, having its shank extended forward from the cutting-edge in the direction of its movement, in combination with a revolving cutter-head, to which the tool-shank is fixed in advance of the cutting-edge, substantially as herein described.

In witness whereof I hereunto set my hand.

ALBION IRVING SANBORN.

Witnesses:
EARL BARTLETT,
J. H. BLOOD.